(12) United States Patent
Sandblad

(10) Patent No.: US 9,294,904 B2
(45) Date of Patent: Mar. 22, 2016

(54) IMS/RCS WI-FI DIRECT SUPPORT

(71) Applicant: Sony Corporation, Tokyo (JP)

(72) Inventor: Andreas Sandblad, Lund (SE)

(73) Assignee: Sony Corporation, Tokyo (JP)

( * ) Notice: Subject to any disclaimer, the term of this patent is extended or adjusted under 35 U.S.C. 154(b) by 115 days.

(21) Appl. No.: 14/170,239

(22) Filed: Jan. 31, 2014

(65) Prior Publication Data

US 2015/0223045 A1    Aug. 6, 2015

(51) Int. Cl.
*H04W 76/02* (2009.01)
*H04W 8/00* (2009.01)
*H04L 29/08* (2006.01)
*H04W 84/12* (2009.01)

(52) U.S. Cl.
CPC ............ *H04W 8/005* (2013.01); *H04L 67/104* (2013.01); *H04W 76/023* (2013.01); *H04W 84/12* (2013.01)

(58) Field of Classification Search
CPC ..... H04W 4/023; H04W 4/005; H04W 4/025; H04W 64/00
USPC .................... 370/338; 455/404.2, 41.1, 456.1
See application file for complete search history.

(56) References Cited

U.S. PATENT DOCUMENTS

| 2005/0220045 | A1  | 10/2005 | Lin |
| 2012/0011247 | A1  | 1/2012 | Mallik et al. |
| 2012/0166531 | A1* | 6/2012 | Sylvain .......................... 709/204 |
| 2013/0203376 | A1* | 8/2013 | Maier et al. ................ 455/404.2 |
| 2013/0217332 | A1  | 8/2013 | Altman et al. |
| 2014/0092885 | A1* | 4/2014 | Venkatachalam et al. ..... 370/338 |
| 2014/0108568 | A1* | 4/2014 | Lee ................................ 709/206 |
| 2014/0213306 | A1* | 7/2014 | Blankenship et al. ........ 455/457 |

FOREIGN PATENT DOCUMENTS

EP    2408234 A1    1/2012

OTHER PUBLICATIONS

International Search Report and Written Opinion; May 21, 2015; issued in International Patent Application No. PCT/EP2014/079436.

* cited by examiner

*Primary Examiner* — Dang Ton
*Assistant Examiner* — Sai Aung
(74) *Attorney, Agent, or Firm* — James C. Edwards; Moore & Van Allen PLLC

(57) ABSTRACT

The invention is directed to communicating data from a first device to a second device. An exemplary method comprises transmitting first device information from the first device to the second device, the first device information comprising a first location and first device identification information associated with the first device; receiving, from the second device, second device identification information associated with the second device, the second device information comprising a second location and second device information associated with the second device; enabling Wi-Fi Direct on the first device in response to determining, based on the first location and the second location, the first device is located less than or equal to a predetermined distance from the second device; initiating a Wi-Fi Direct scan on the first device; discovering the second device information during the scan; connecting to the second device via Wi-Fi Direct; and communicating data to the second device.

14 Claims, 2 Drawing Sheets

IMS/RCS WI-FI DIRECT SUPPORT

BACKGROUND

The rich communication services (RCS) program is an initiative to provide inter-operator services within an industry ecosystem. Created by the GSM Association (GSMA), RCS is designed to provide richer yet simpler communication services supported by a strong network ecosystem. RCS has enabled the transition of messaging (e.g., instant messaging), file transfer, and voice capabilities from circuit switching technology to the internet protocol (IP) and long-terminal evolution (LTE) domain. RCS is supported by several carriers around the world. RCS can be associated with the IP multimedia subsystem or IP multimedia core network subsystem (IMS), which is a framework for providing IP multimedia services. It was originally designed by the wireless standards body 3rd Generation Partnership Project (3GPP).

BRIEF SUMMARY

Embodiments of the invention are directed to a system, method, and computer program product for communicating data from a first device to a second device. An exemplary method comprises: transmitting first device information from the first device to the second device, the first device information comprising a first location and first device identification information associated with the first device; receiving, from the second device, second device information associated with the second device, the second device information comprising a second location and second device identification information associated with the second device; enabling wireless fidelity direct (Wi-Fi Direct) on the first device in response to determining, based on the first location and the second location, the first device is located less than or equal to a predetermined distance from the second device; initiating a Wi-Fi Direct scan on the first device; discovering the second device information during the Wi-Fi Direct scan; connecting to the second device via Wi-Fi Direct; and communicating data to the second device via Wi-Fi Direct.

In some embodiments, the first device information further comprises a temporary security encryption key.

In some embodiments, the temporary security encryption key is used to encrypt the communicated data.

In some embodiments, the communicated data is communicated in a message session relay protocol (MSRP) session.

In some embodiments, the communicated data is communicated via session initiation protocol (SIP) protocol.

In some embodiments, the location comprises at least one of network location or a geographical location.

In some embodiments, the location is defined in relation to a distance from a mobile cell station.

In some embodiments, the first device identification information comprises a first media access control (MAC) address.

In some embodiments, at least one of the first device or the second device operates based on the rich communication services (RCS)/internet protocol multimedia subsystem (IMS) standard.

In some embodiments, at least one of the first location or the first device identification information is hashed.

In some embodiments, the first device or the second device comprises a mobile phone, a mobile computing device, a mobile television, a laptop computer, a smart screen, a tablet computer, a portable desktop computer, an e-reader, a scanner, a portable media device, a gaming device, a camera, a watch, or a band or other wearable device.

In some embodiments, the method further comprises: enabling Bluetooth on the first device in response to determining, based on the first location and the second location, the first device is located less than or equal to a second predetermined distance from the second device, wherein the second predetermined distance is less than the predetermined distance; initiating a Bluetooth scan on the first device; discovering the second device information during the Bluetooth scan; connecting to the second device via Bluetooth; and communicating data to the second device via Bluetooth.

In some embodiments, a first device is provided for communicating data from a first device to a second device. The first device comprises: a memory; a processor; a module stored in the memory, executable by the processor, and configured to: transmit first device information from the first device to the second device, the first device information comprising a first location and first device identification information associated with the first device; receive, from the second device, second device information associated with the second device, the second device information comprising a second location and second device identification information associated with the second device; enable Wi-Fi Direct on the first device in response to determining, based on the first location and the second location, the first device is located less than or equal to a predetermined distance from the second device; initiate a Wi-Fi Direct scan on the first device; discover the second device information during the Wi-Fi Direct scan; connect to the second device via Wi-Fi Direct; and communicate data to the second device via Wi-Fi Direct.

In some embodiments, at least one of the first device or the second device operates based on the rich communication services (RCS)/internet protocol multimedia subsystem (IMS) standard.

In some embodiments, a computer program product is provided for communicating data from a first device to a second device. The computer program product comprises a non-transitory computer-readable medium comprising code configured to: transmit first device information from the first device to the second device, the first device information comprising a first location and first device identification information associated with the first device; receive, from the second device, second device information associated with the second device, the second device information comprising a second location and second device identification information associated with the second device; enable Wi-Fi Direct on the first device in response to determining, based on the first location and the second location, the first device is located less than or equal to a predetermined distance from the second device; initiate a Wi-Fi Direct scan on the first device; discover the second device information during the Wi-Fi Direct scan; connect to the second device via Wi-Fi Direct; and communicate data to the second device via Wi-Fi Direct.

BRIEF DESCRIPTION OF THE DRAWINGS

Figure 1:
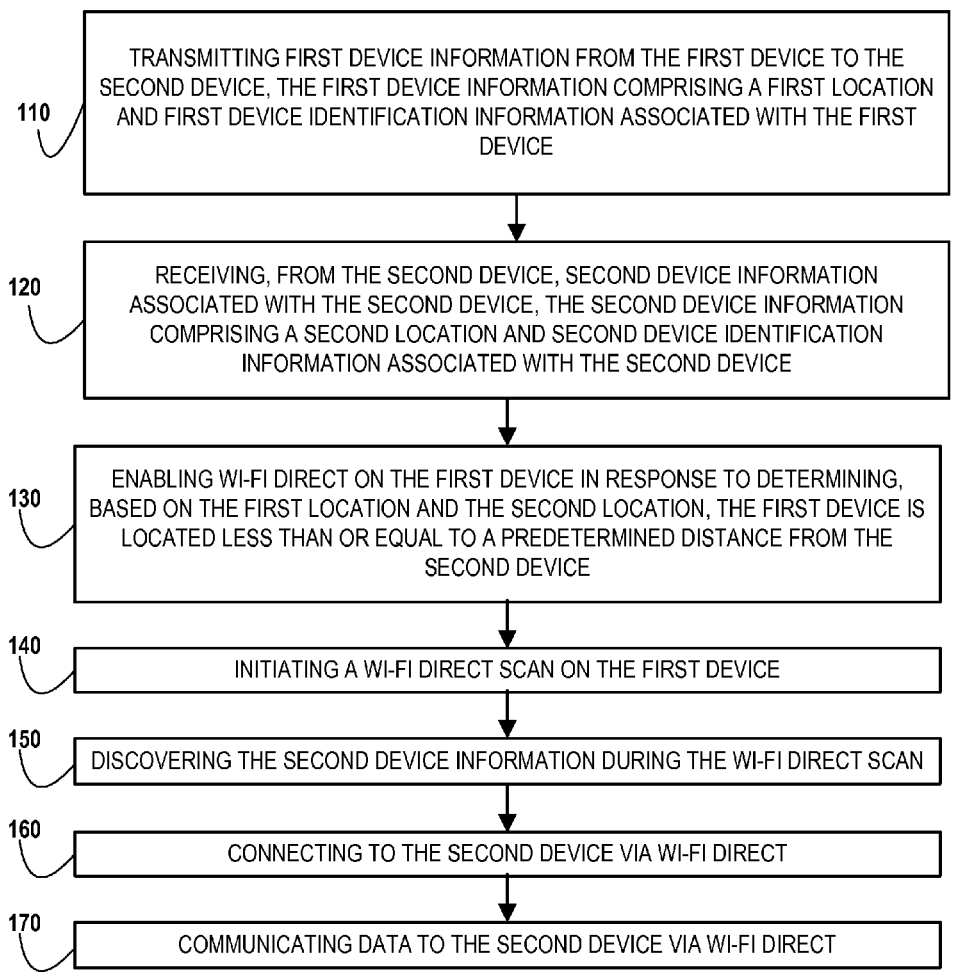
Figure 2:
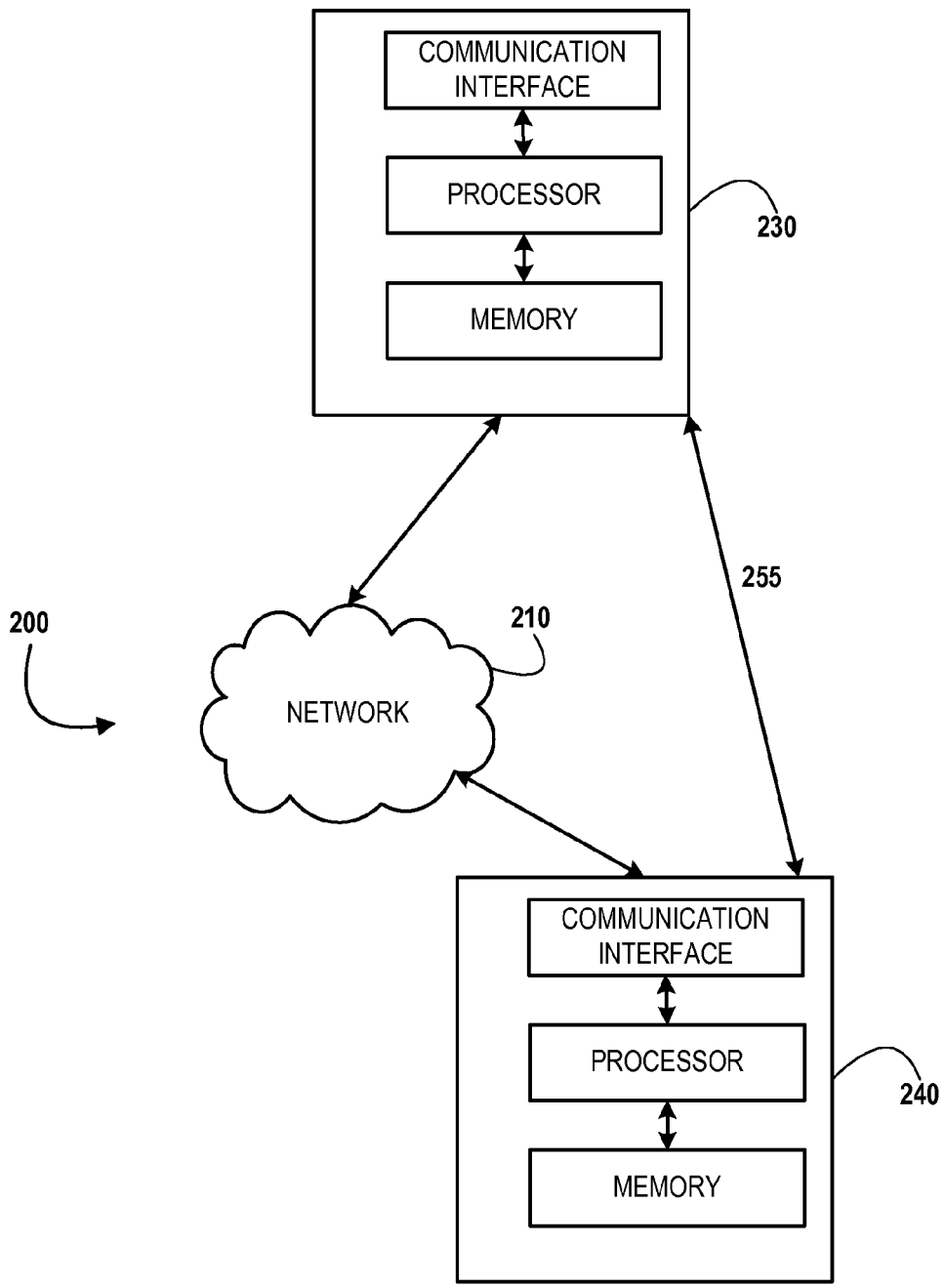

Having thus described embodiments of the invention in general terms, reference will now be made to the accompanying drawings, where:

FIG. 1 presents an exemplary process flow for communicating data from a first device to a second device, in accordance with embodiments of the present invention; and FIG. 2 presents an exemplary data communication environment, in accordance with embodiments of the present invention.

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

The IMS/RCS standard is being pushed by mobile network operators to enable devices to communicate with each other peer to peer using the operators' IMS network and the telephony number (e.g., network address) of the device as the identity of the device. The present invention is directed to enabling devices that are within a predetermined range of each other to communicate directly with each other over Wi-Fi Direct in order to limit data passing over the mobile network and in order to enable faster communication speeds for applications using the IMS/RCS standard as a device identification service. Wi-Fi Direct is a Wi-Fi standard that enables devices to connect with each other without requiring a wireless access point (e.g., a router or a system connected to a router). The present invention enables establishment of a message session relay protocol (MSRP) session between two devices (e.g., a first device and a second device). MSRP is a protocol for transmitting instant messages during a communication session. Therefore, the present invention enables two devices to connect with each other using the IMS/RCS standard without requiring the devices to be updated to connect to a network. As used herein, a device refers to any device (e.g., a mobile device) that communicates wirelessly with a network. The mobile device may be a portable device (e.g., a mobile phone) or may be a non-portable device (e.g., a desktop computer). The present invention enables direct data communication between two devices, and enables the devices to skip intermediate steps associated with connecting to a network to enable data communication.

Additionally or alternatively to a MSRP session, the present invention enables communication of data between the two devices via Session Initiation Protocol (SIP). SIP is a signaling protocol used for controlling multimedia communication sessions over Internet Protocol (IP) networks. IMS uses the SIP protocol.

Referring now to FIG. 1, FIG. 1 describes an exemplary process flow for communicating data from a first device to a second device. At step 110, the process flow comprises transmitting first device information from the first device to the second device, the first device information comprising a first location (e.g., a network address, a geographical address, or a rough position in relation to a known mobile network cell station) and first device identification information (e.g., a first media access control (MAC) address) associated with the first device. At step 120, the process flow comprises receiving, from the second device, second device information associated with the second device, the second device information comprising a second location and second device identification information associated with the second device. At step 130, the process flow comprises enabling Wi-Fi Direct on the first device in response to determining, based on the first location and the second location, the first device is located less than or equal to a predetermined distance (e.g., 100 meters) from the second device. At step 140, the process flow comprises initiating a Wi-Fi Direct scan on the first device. At step 150, the process flow comprises discovering the second device information (e.g., the second device identification information) during the Wi-Fi Direct scan. At step 160, the process flow comprises connecting to the second device via Wi-Fi Direct. At step 170, the process flow comprises communicating data to the second device via Wi-Fi Direct. The communicated data may be communicated in a MSRP session. At least one of the first device or the second device operates based on the rich communication services (RCS)/ internet protocol multimedia subsystem (IMS) standard.

In some embodiments, the first device information further comprises a temporary security encryption key. The temporary security encryption key is used to encrypt the data communicated from the first device to the second device. In some embodiments, at least one of the first location or the first device identification information is hashed for privacy purposes. In some embodiments, the location comprises at least one of network location (e.g., internet protocol (IP) address) or a geographical location (e.g., global position system (GPS) location coordinates). In other embodiments, the location is defined in relation to a distance from a mobile cell station.

As indicated above, based on the locations of both devices, at least one of the two devices (either the first device or the second device) determines that the devices are less than or equal to a predetermined distance from each other. If Wi-Fi Direct has already been enabled on each device, each device continues to operate in Wi-Fi Direct mode. If Wi-Fi Direct has not already been enabled on each device, each device actives the Wi-Fi Direct mode. Each device subsequently initiates a Wi-Fi Direct scan. If the first device finds the second device's identification information (e.g., MAC address) during the scan, the first device connects to the second device via Wi-Fi Direct and uses the temporary security encryption key to encrypt the communication between the two devices. Some mobile networks limit the maximum amount of data traffic for a device to predetermined threshold (e.g., 1.5 GB/day). The present invention enables devices to communicate data exceeding this predetermined threshold. In some embodiments, the communication capability described herein is hidden (e.g., from a user). However, the communication capability may be transparent to an application being executed on a mobile device. Additionally, the present invention enables the two devices to connect with each other via Wi-Fi Direct when they are not connected to the same mobile network, when they are connected to the same mobile network, or when at least one of the devices is not connected to a network at all.

In some embodiments, when the first device determines that the second device is located with a second shorter predetermined distance (e.g., 30 meters) from the first device, the present invention enables data communication via Bluetooth, instead of or in addition to communication via Wi-Fi Direct. In such embodiments, the first device enables Bluetooth on the first device in response to determining, based on the first location associated with the first device and the second location associated with the second device, that the first device is located less than or equal to a second predetermined distance from the second device. The second predetermined distance (e.g., 30 meters) is less than the predetermined distance (e.g., 100 meters). Subsequently, the first device initiates a Bluetooth scan and discovers the second device information (e.g., the second device identification information) during the Bluetooth scan. The second device identification information associated with a Bluetooth scan may be different from the second device identification information associated with the Wi-Fi Direct scan. Then, the first device connects to the second device via Bluetooth, and communicates data to the second device via Bluetooth.

The invention is not limited to Wi-Fi Direct and Bluetooth. In alternate embodiments, the communication between the first and second device can occur on any peer-to-peer carrier. While the examples described herein are based on Wi-Fi Direct and Bluetooth, Wi-Fi Direct and Bluetooth may represent any peer-to-peer carrier. For example, a substitute peer-to-peer carrier is Zigbee.

The invention is not limited to any particular types of devices. As used herein, a device may also be referred to as a system. Examples of devices include mobile phones or other mobile computing devices, mobile televisions, laptop computers, smart screens, tablet computers or tablets, portable desktop computers, e-readers, scanners, portable media devices, gaming devices, eyeglasses, eyewear, cameras or other image-capturing devices, watches, bands (e.g., wristbands) or other wearable devices, or other portable or non-portable computing or non-computing devices.

Referring now to FIG. 2, FIG. 2 presents an exemplary block diagram of the network environment 200 for implementing the process flow described herein, in accordance with embodiments of the present invention. As illustrated, the system environment 200 includes a network 210, a first device 230, and a second device 240. As shown in FIG. 2, the first device 230 and the second device 240 are each operatively and selectively connected (e.g., via one or more wireless mechanisms) to the network 210, which may include one or more separate networks. The present invention enables the first device 230 and the second device 240 to communicate with each other regardless of whether they are connected to the network 210. Even though the first device 230 and the second device 240 are connected to the network 210, the first and device 230 and the second device 240 communicate data with each other via Wi-Fi Direct 255 and not via the network 210. The first device 230 is a computing device that comprises a processor, a memory, and a module stored in the memory, executable by the processor, and configured to perform the various processes described herein. The second device 240 is also a computing device that comprises a processor, a memory, and a module stored in the memory, executable by the processor, and configured to perform the various processes described herein.

Each processor described herein generally includes circuitry for implementing audio, visual, and/or logic functions. For example, the processor may include a digital signal processor device, a microprocessor device, and various analog-to-digital converters, digital-to-analog converters, and other support circuits. Control and signal processing functions of the system (e.g., first device or second device) in which the processor resides may be allocated between these devices according to their respective capabilities. The processor may also include functionality to operate one or more software programs based at least partially on computer-executable program code portions thereof, which may be stored, for example, in a memory.

Each memory may include any computer-readable medium. For example, memory may include volatile memory, such as volatile random access memory (RAM) having a cache area for the temporary storage of information. Memory may also include non-volatile memory, which may be embedded and/or may be removable. The non-volatile memory may additionally or alternatively include an EEPROM, flash memory, and/or the like. The memory may store any one or more of pieces of information and data used by the system in which it resides to implement the functions of that system.

In accordance with embodiments of the invention, the term "module" with respect to a system (or a device) may refer to a hardware component of the system, a software component of the system, or a component of the system that includes both hardware and software. As used herein, a module may include one or more modules, where each module may reside in separate pieces of hardware or software.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. As used herein, "at least one" shall mean "one or more" and these phrases are intended to be interchangeable. Accordingly, the terms "a" and/or "an" shall mean "at least one" or "one or more," even though the phrase "one or more" or "at least one" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, microcode, stored procedures in a database, etc.), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A method for communicating data from a first device to a second device, the method comprising:
    prior to enabling wireless fidelity direct (Wi-Fi Direct) on the first device, transmitting first device information from the first device to the second device, the first device information comprising a first location and first device identification information comprising a Media Access Control (MAC) address associated with the first device;
    receiving, from the second device, second device information associated with the second device, the second device information comprising a second location and second device identification information comprising a Media Access Control (MAC) address associated with the second device;
    enabling Wi-Fi Direct on the first device in response to determining, based on the first location and the second location, the first device is located less than or equal to a predetermined distance from the second device;
    initiating a Wi-Fi Direct scan on the first device;
    discovering the MAC address associated with the second device during the Wi-Fi Direct scan;
    connecting to the second device via Wi-Fi Direct; and
    communicating data to the second device via Wi-Fi Direct.

2. The method of claim 1, wherein the first device information further comprises a temporary security encryption key.

3. The method of claim 2, wherein the temporary security encryption key is used to encrypt the communicated data.

4. The method of claim 1, wherein the communicated data is communicated in a message session relay protocol (MSRP) session.

5. The method of claim 1, wherein the communicated data is communicated via session initiation protocol (SIP) protocol.

6. The method of claim 1, wherein the location comprises at least one of network location or a geographical location.

7. The method of claim 1, wherein the location is defined in relation to a distance from a mobile cell station.

8. The method of claim 1, wherein at least one of the first device or the second device operates based on the rich communication services (RCS)/internet protocol multimedia subsystem (IMS) standard.

9. The method of claim 1, wherein at least one of the first location or the first device identification information is hashed.

10. The method of claim 1, wherein the first device or the second device comprises a mobile phone, a mobile computing device, a mobile television, a laptop computer, a smart screen, a tablet computer, a portable desktop computer, an e-reader, a scanner, a portable media device, eyewear, a gaming device, eyeglasses, a camera, a watch, or a band or other wearable device.

11. The method of claim 1, further comprising:
    enabling Bluetooth on the first device in response to determining, based on the first location and the second location, the first device is located less than or equal to a second predetermined distance from the second device, wherein the second predetermined distance is less than the predetermined distance;
    initiating a Bluetooth scan on the first device;
    discovering the second device information during the Bluetooth scan;
    connecting to the second device via Bluetooth; and
    communicating data to the second device via Bluetooth.

12. A first device for communicating data from the first device to a second device, the system comprising:

a memory;
a processor;
a module stored in the memory, executable by the processor, and configured to:
   prior to enabling wireless fidelity direct (Wi-Fi Direct) on the first device, transmit first device information from the first device to the second device, the first device information comprising a first location and first device identification information comprising a Media Access Control (MAC) address associated with the first device;
   receive, from the second device, second device information associated with the second device, the second device information comprising a second location and second device identification information comprising a Media Access Control (MAC) address associated with the second device;
   enable Wi-Fi Direct on the first device in response to determining, based on the first location and the second location, the first device is located less than or equal to a predetermined distance from the second device;
   initiate a Wi-Fi Direct scan on the first device;
   discover the MAC Address associated with the second device during the Wi-Fi Direct scan;
   connect to the second device via Wi-Fi Direct; and
   communicate data to the second device via Wi-Fi Direct.

13. The first device of claim 12, wherein the first device operates based on the rich communication services (RCS)/internet protocol multimedia subsystem (IMS) standard.

14. A computer program product for communicating data from a first device to a second device, the computer program product comprising a non-transitory computer-readable medium comprising code configured to:
   prior to enabling wireless fidelity direct (Wi-Fi Direct) on the first device, transmit first device information from the first device to the second device, the first device information comprising a first location and first device identification information comprising a Media Access Control (MAC) address associated with the first device;
   receive, from the second device, second device information associated with the second device, the second device information comprising a second location and second device identification information comprising a Media Access Control (MAC) address associated with the second device;
   enable Wi-Fi Direct on the first device in response to determining, based on the first location and the second location, the first device is located less than or equal to a predetermined distance from the second device;
   initiate a Wi-Fi Direct scan on the first device;
   discover the MAC address associated with the second device during the Wi-Fi Direct scan;
   connect to the second device via Wi-Fi Direct; and
   communicate data to the second device via Wi-Fi Direct.

* * * * *